Aug. 11, 1959  F. H. MILLIKEN  2,898,741
SPRING CLIP FOR PERFORATED PIPES AND THE COMBINATION
Original Filed May 28, 1949  2 Sheets-Sheet 1
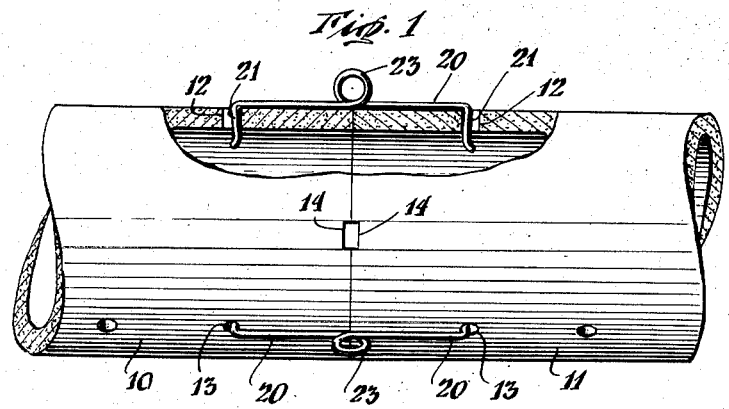
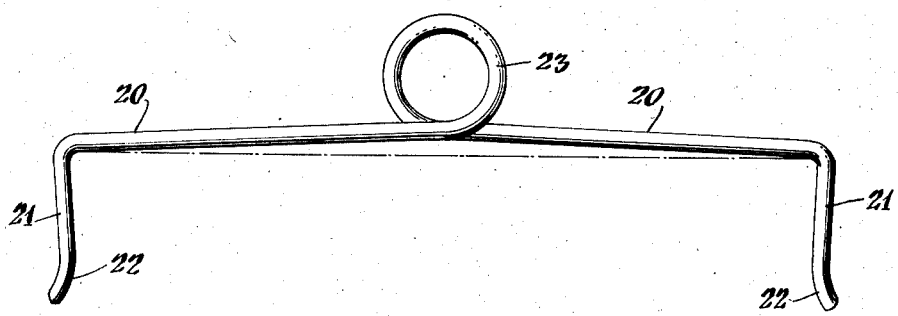
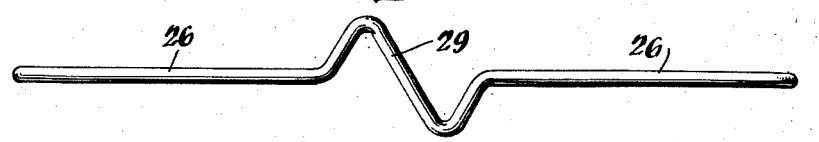
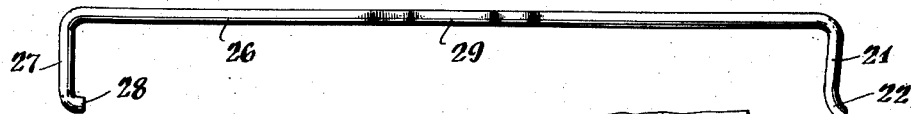
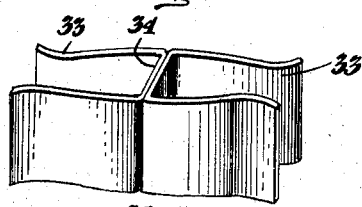
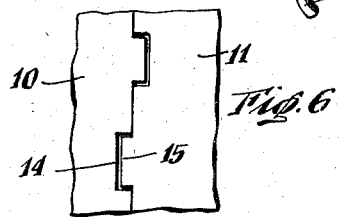
INVENTOR.
Frank H. Milliken
BY
ATTORNEYS Aug. 11, 1959 F. H. MILLIKEN 2,898,741
SPRING CLIP FOR PERFORATED PIPES AND THE COMBINATION
Original Filed May 28, 1949 2 Sheets-Sheet 2
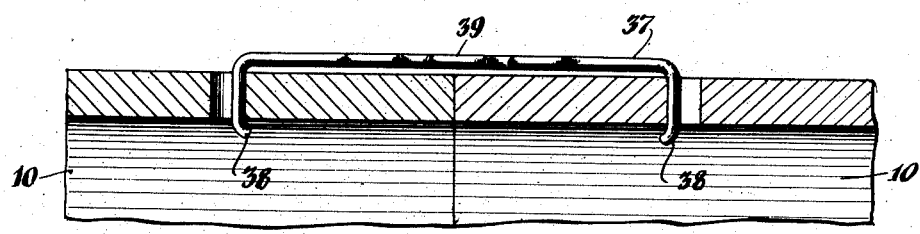
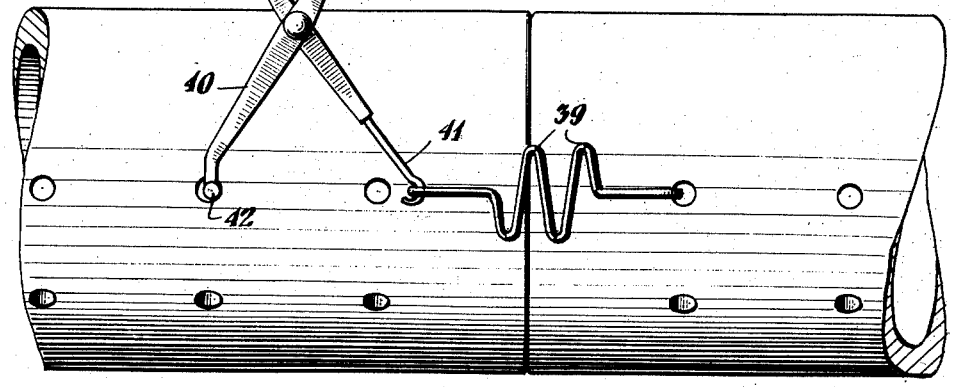
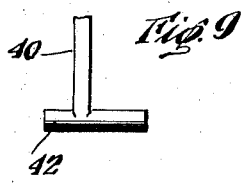
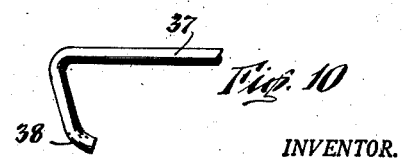
INVENTOR.
Frank H. Milliken
BY
Bohleber, Jassett & Montstream
ATTORNEYS

United States Patent Office 2,898,741
Patented Aug. 11, 1959

2,898,741

SPRING CLIP FOR PERFORATED PIPES AND THE COMBINATION

Frank H. Milliken, Bowerston, Ohio, assignor to The Bowerston Shale Company, Bowerston, Ohio, a corporation of Ohio Continuation of application Serial No. 95,932, May 28, 1949. This application May 9, 1950, Serial No. 160,944

4 Claims. (Cl. 61—11)

The invention relates to a spring clip for holding two straight ends of perforated pipe together such as drain pipe and also to hold them in alignment.

The invention also includes the combination of the clip and the perforated pipe such as drain pipe. Heretofore the abutting ends of drain pipe have been retained in alignment or substantial alignment by one end of the pipe being bell-mouthed to receive the plain or straight end of the next pipe. In other types a separate collar receiving adjacent ends of straight ended pipe has been used as a substitute for the socket or bell mouth carried by one end of each pipe. With the spring clip herein, plain or straight ended and perforated pipe may be kept together and in alignment without the use of a bell upon one end of the pipe or a separate collar.

This application is a continuation of application S.N. 95,932 filed May 28, 1949, now abandoned.

It is an object of the invention to construct a spring clip for securing the ends of perforated pipe together and in alignment.

Another object is to construct a spring clip for securing abutting ends of perforated pipe together and in alignment and to provide a finger hold therefor.

Another object of the invention is to provide a new combination of one or more spring clips with perforated pipe such as drainage pipe for securing the abutting ends thereof together and in alignment.

Other objects of the invention will be more apparent from the following description when taken in connection with the accompanying drawings illustrating some preferred embodiments thereof in which:

Figure 1 is a plan view, about half size, and in partial section, showing abutting ends of plain and perforated pipe secured together and retained in alignment by a pair of spring clips;

Figure 2 is a side elevational view of a spring clip in full size;

Figure 3 is a plan view of another form of spring clip;

Figure 4 is a side elevation of the clip of Figure 3;

Figure 5 is a perspective view of a secondary clip;

Figure 6 is a partial view of another form of pipe end;

Figure 7 is a view of another form of clip as made from tempered spring wire and connecting two pipe ends shown in section;

Figure 8 is a plan view of a clip being stretched by a tool into a hole in a pipe;

Figure 9 is a partial view of one arm of the clip inserting or stretching tool; and Figure 10 is a view of the end of the clip when relaxed.

Baked clay drain pipe as presently made utilizes a bell-mouth for retaining the abutting ends of two pipes together. The formation of the bell-mouth entails additional operations and labor which increase the expensiveness of this type of pipe. Another form of pipe has straight or plain ends which pipe can be extruded continuously and cut off to length. A separate collar is used for retaining the ends in alignment in place of a belled end. Such continuous method of manufacturing pipe is more economical. These collars must be separately formed and baked. With the spring clip of the invention pipe which is plain ended or straight throughout its length is used and one or more inexpensive retaining clips are used to retain the abutting ends of the pipe together and in alignment. The spring clips are particularly inexpensive as compared with the bell-mouthed pipe or the separate collar.

The spring clip may be used with any perforated pipe but it has particular applicability with baked clay drain pipe. The drain pipes 10 and 11 shown in Figure 1 are plain ended or straight throughout their length and have a plurality of rows 12, 13 of perforations shown as spaced about three inches apart extending the length of the pipe. For the purpose of holding the abutting ends together and in alignment one hole adjacent each end is sufficient; however, such pipe would not be efficient for drainage purposes. These rows of perforations may be any size although ⅜ inch is a common diameter therefor. These rows of perforations may be solely in the lower 180° of the pipe or may be distributed either uniformly or non-uniformly around the entire pipe circumference. Although two rows of perforations are shown it is customary for drain pipe to have several additional rows. The ends of the pipe need not be plain ended but one or both ends may carry notches 14 for additional drainage openings. The notch 14 may receive a projection 15 in the abutting pipe end as shown in Figure 6.

A spring clip 20 is utilized to hold the abutting ends of two pipes together. One or more additional like clips may be used to retain the pipe ends in alignment so that water draining into a line of pipe will have a free and unobstructive flow from one pipe into the next or other means may be used for retaining the pipe ends in alignment.

The spring clip may take several different forms, that illustrated in Figures 1 and 2 being a stiff spring wire about ⅛ of an inch in diameter, each end of which is bent approximately at right angles to the central portion of the wire to form a retaining means 21. At least one end may be bent slightly inwardly to form a sort of catch when inserted in the hole of a pipe. The extreme end of the retaining means may be bent outwardly to form a camming surface 22 for more easily inserting the end of the clip into the hole of the pipe.

In the spring clips shown, the dimension between the inner faces of the retaining means 21 is about ⅛ of an inch less than the spacing between adjacent surfaces of the hole at the end of each of the two abutting pipes so that the securing means or ends of the spring clip must be resiliently spread apart in order to be inserted in place. For example, the easier way to use the clip is to insert one retaining means in one hole of one pipe and then the other retaining means is sprung outwardly in inserting it into the hole in the abutting pipe. The spring clip shown is bowed between the securing or retaining means at the ends to provide the resiliency or spring for the clip. The extent or amount of upward bow may be slight when additional or increased resiliency is provided in the clip.

Increased resiliency in the clip is desirable and may be secured as in the form of Figure 2 by an outwardly projecting loop 23, a single loop being shown. It is clear that a loop of one or more turns may be used or spaced loops may be used for obtaining resiliency. The loop is desirable as a means for increasing the resiliency of the spring clip because the loop also provides a finger hold in the event it should be desired to shift a line of the pipe or the end of a line of pipe for any reason.

In using the spring clip the perforated or drain pipe is placed end to end with corresponding rows of holes in alignment. The spring clip has one retaining or securing means inserted in a hole 12 in one pipe and the other securing means is inserted in the adjacent hole 12 in the abutting pipe and the spring clip pressed thereinto, the camming surface 22 aiding in spreading the securing means for the insertion of the securing means therein. The bow in the spring clip straightens as shown in Figure 1 during this process and the bow and loop tend to restore the bow thereby resiliently holding the abutting ends of the pipe together. In order to assure that the pipe ends remain in alignment, two or more clips may be used in holes spaced preferably at least 90° from each other.

Figure 3 shows another style of spring clip 26 in which the securing means 27 at one end is of the hooked type in which the extreme end 28 is bent inwardly to form a catch or projection. This turned-in end should be small enough so that the end can be inserted in the hole or perforation 12 or 13 provided in the pipe. With this type of spring clip the securing means 27 must be first inserted in the drain pipe hole. The retaining or securing means at the other end is the same as that shown in the form of Figure 2. In the clip of Figure 3, a wave or double V form of bend 29 is provided in the connecting portion of the spring clip to increase the resiliency between the retaining means. The dimension between the retaining means 21 and 27 is a little less than the dimension between adjacent surfaces of the holes 12 or 13 as described in connection with the clip of Figure 2. This type of spring clip lies closer to the pipe and does not provide a finger hold as does the clip of Figure 2. This clip also may be bowed if desired for added resiliency. Any suitable means may be utilized to secure resiliency or increased resiliency of the spring clip.

Instead of utilizing two or more spring clips, a double U-shaped clip 32, as shown in Figure 5, may be used in one or more positions around the pipe with one spring clip in another position which holds the pipe ends together such as that of Figures 2 or 4. In this combination, the spring clip holds the ends of the pipe together against separation and the U-shaped clips prevent the abutting pipe ends from pivoting out of alignment about the spring clip as a pivot. These double U-shaped clips are inexpensive to form and may be constructed by shaping a pair of metallic U's 33 and welding them together at their centers 34.

The clips are made of spring metal and eventually rust away. The spring clips are intended to hold the ends of pipe together and in alignment when being laid and for a sufficient time thereafter until the soil which has been filled in around the pipe in the trench has settled and packed therearound to thereafter hold the pipe ends together and in alignment.

The drain pipe ends of Figure 6 will prevent the ends of the pipe from pivoting when a single spring clip is used. The simpler form of construction, or combination, however, is to use two spring clips of the form of Figures 2 and/or 4. With at least two such clips the pipe ends are securely held together and in alignment.

Figure 7 shows the abutting ends of two drain pipes 10 and 11 having holes 12 therethrough spaced from the ends thereof. A clip 37 has one end projected through a hole 12 in pipe 10 and the other projected in a hole in the pipe 11 thereby holding the two ends of the pipe together. The ends of the clip are bent in excess of 90 degrees to the central portion as shown in Figure 10 to form the retaining or securing means which fit into the pipe holes. The end 38 of each retaining means is bent in additional amount towards the other retaining means so that these ends, projections or horns will retain the clip retaining means in the holes of the drainage pipe wall. The reason for this construction of retaining means is that tempered spring wire does not have as much bending at the bend B between the central portion and the retaining means as a clip shown in Figures 2 and 4 made of hard drawn wire. Increased flexibility of the central portion may be secured by increasing the number of bends 39, which may take any form, the V form shown being preferred. It is clear that this spring clip also may have one end similar to the end 27, 28 of the clip of Figure 4.

Figure 8 illustrates a form of tool for stretching and inserting the spring clips in order to hold the ends of two pipes together. This tool has pivoted arms, one arm 40 having a pin 42 projecting preferably from both sides of the arm. The pin 42 is small enough to be inserted in a hole 12 in the drain pipe. The other arm has a hook 41. In use the pin 42 is inserted in a second hole in the drain pipe spaced from the hole 12 and the other arm has its hook 41 engaging the retaining means of the clip. By squeezing the handles of the tool the hook is moved towards the pin arm which stretches the clip and brings the retaining means on the end thereof to the hole 12 which is inserted therein after which the hook is released from the retaining means and the tool removed. The clip may then be pressed into contact with the pipe.

This invention provides an improvement in a spring clip for perforated pipes and the combination. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A drain pipe combination comprising a pair of drain pipes having drainage holes through the wall thereof adjacent at least one pair of abutting ends of the pair of pipes, the pipe ends being in direct contact with each other, means to secure the abutting pipe ends together and in alignment including solely a plurality of spring clips spaced circumferentially around the pipe at adjacent ends thereof; one spring clip including a rod having retaining means at one end bent substantially at right angles thereto and of a size to be inserted in a hole in the pipe, a retaining means at the other end of the rod bent substantially at right angles thereto and of a size to be inserted in a hole in the abutting pipe, the two retaining means being spaced apart a distance less than the spacing between holes adjacent the end of abutting pipe ends, the retaining means having a length adapted to extend through the wall of the pipe, and spring means in the rod of at least one wave conformation in a plane at right angles to the retaining means and between the retaining means formed by at least one bend to give substantial longitudinal extensibility for the spacing between the retaining means.

2. A drain pipe combination as in claim 1 including at least one double U-shaped clip receiving the adjacent pipe ends at a point spaced from the spring clip.

3. A drain pipe combination as in claim 1 in which at least one retaining means is bent in excess of a right angle.

4. A drain pipe combination as in claim 1 in which at least one retaining means is bent in excess of a right angle, and including an inwardly directed projection upon the end thereof.

References Cited in the file of this patent

UNITED STATES PATENTS

| Re. 15,301 | Naugle | Mar. 7, 1922 |
| 439,994 | Ballard | Nov. 4, 1890 |

(Other references on following page)

UNITED STATES PATENTS

| | | |
|---|---|---|
| 460,352 | Reading | Sept. 29, 1891 |
| 752,530 | Dobbin | Feb. 16, 1904 |
| 944,022 | Eken | Dec. 21, 1909 |
| 1,102,823 | Towler | July 7, 1914 |
| 1,169,689 | Smith | Jan. 25, 1916 |
| 1,246,585 | Geraerdts | Nov. 13, 1917 |
| 1,465,848 | Hopkins | Aug. 21, 1923 |
| 1,490,288 | Okland | Apr. 15, 1924 |
| 1,596,291 | Nadon | Aug. 17, 1926 |
| 2,020,815 | Venzie | Nov. 12, 1935 |
| 2,029,920 | Gutman | Feb. 4, 1936 |
| 2,116,165 | Ullman | May 3, 1938 |
| 2,240,411 | Newman | Apr. 29, 1941 |
| 2,264,391 | MacLeod | Dec. 2, 1941 |
| 2,608,828 | Dimick | Sept. 2, 1952 |